United States Patent [19]

Buttafava

[11] 3,740,633

[45] June 19, 1973

[54] FREQUENCY-TO-VOLTAGE CONVERTER DEVICE

[75] Inventor: Pietro Buttafava, Milan, Italy

[73] Assignee: Honeywell Information Systems Italia, Caluso, Italy

[22] Filed: Feb. 14, 1972

[21] Appl. No.: 225,887

[30] Foreign Application Priority Data

Feb. 3, 1971 Italy ............................ 21248 A/71

[52] U.S. Cl. .................. 318/328, 307/233, 324/175

[51] Int. Cl. ............................................ H02p 5/16

[58] Field of Search .......................... 318/328, 318; 307/233; 324/175

[56] References Cited

UNITED STATES PATENTS

| | | | |
|---|---|---|---|
| 3,626,204 | 12/1971 | Brandon | 307/233 |
| 3,591,858 | 7/1971 | Boyd | 307/233 |
| 3,569,737 | 3/1971 | Bauer | 307/233 |
| 3,582,743 | 6/1971 | Diaz | 318/328 |
| 3,656,000 | 4/1972 | Neathery | 307/233 |

*Primary Examiner*—Bernard A. Gilheany
*Assistant Examiner*—Thomas Langer
*Attorney*—Aubrej C. Brine, Fred Jacob and Ronald T. Reiling et al.

[57] ABSTRACT

A frequency-to-voltage converter for use with such devices as magnetic tape handling equipment is provided having a frequency error signal generator providing pulses, a constant current generator, a capacitor and two switches controlled by the pulses. One of the switches discharges the capacitor within a fixed time interval and the other switch connects the capacitor to the current generator for a time interval determined by the pulses. The capacitor is thus charged to reach a voltage of the next pulse, thereby providing a voltage across the capacitor terminals which is a continuous voltage error signal suitable for control purposes.

4 Claims, 8 Drawing Figures

FREQUENCY-TO-VOLTAGE CONVERTER DEVICE

The present invention relates in a general way to frequency-to-voltage transducers and to angular speed measuring devices, or tachometers; and more specifically is related to high precision tachometers used for very accurate speed control devices, as required, for example, by magnetic tape handling devices employed in data processing equipments.

BACKGROUND OF THE INVENTION

It is known to use dynamo-tachometers to obtain voltage signals proportional to the rotational speed. However, the quality of the voltage signal supplied thereby does not meet the specific requirements of many applications as the above named one. This is due to the structure of the dynamo, which necessarily comprises a commutator ring having a finite number of segments and associated winding sections, and to the transient phenomena associated with the commutation process.

These transients cause an undesirable electrical noise affecting the output signal. The noise may be reduced by suitable filtering, which however, considerably increases the response time of the speed measuring system.

In addition, the dynamo-tachometer comprises a rotor having a relatively high inertia, which must be coupled to the rotating member whose speed has to be measured.

For these reasons the use of dynamo-tachometers, either is not possible, or results in critical operating conditions in all these applications where fast and accurate control speed of low-inertia rotating members is required.

It is known, for example, that in magnetic tape units for data processing equipment, timing discs coupled to the tape driving capstan and associated to pulse detectors are suitably used to produce a pulse signal having a repetition rate representative of the rotational speed of the capstan.

Each period of this pulse signal is compared to a reference time interval, to produce an error signal, usually resulting in a sequence of pulses having the same repetition rate as the originating pulse signal, and a pulse length variable as a function of the deviation of the rotational speed from the correct value.

This error signal is used to drive a control circuit operating according to the method known as "time proportioning method."

Even this form of speed control has some disadvantages, because the "time proportioning" regulation method may cause a sensible amount of capstan jitter, which may result in a considerable limitation of the tape unit performance.

It is therefore an object of the present invention to overcome these disadvantages by the providing of a frequency-to-voltage converter, which provides a signal suitable for fast and precise linear speed regulation.

SUMMARY OF THE INVENTION

Briefly stated, the frequency-to-voltage converter according to the invention, comprises a frequency error signal generator, providing pulses of variable length depending on the detected speed error, a constant current generator, a capacitor and two switches controlled by the pulses.

One of the switches is actuated, on reception of said pulses, to discharge the capacitor within a fixed and very short time interval. The other one is actuated to connect the constant current generator to the capacitor for a time interval defined by the length of the pulses.

Accordingly, the capacitor is charged to reach a voltage depending on the length of said pulses, and this voltage is maintained until reception of the next pulse.

Thus, the voltage across the capacitor terminals is a nearly continuous variable voltage signal interrupted by very short spikes which may be easily filtered out, if required, thus providing a continuous voltage error signal particularly suitable for control of equipment such as mentioned above.

BRIEF DESCRIPTION OF THE DRAWINGS

The invention will be better understood by reference to the annexed drawings, in which.

DESCRIPTION OF A PREFERRED EMBODIMENT

Figure 1:
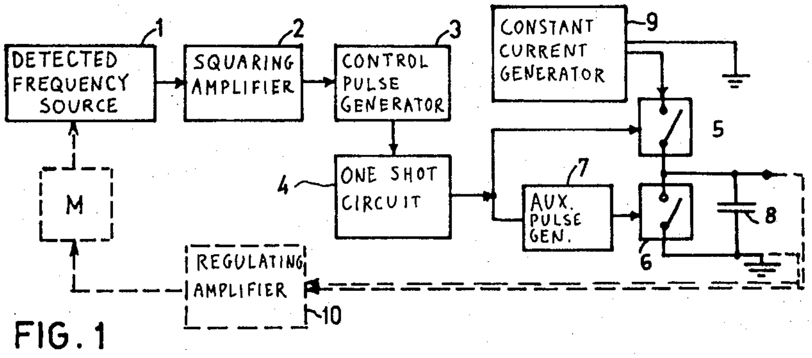
FIG. 1 shows a schematic block diagram of a frequency-to-voltage converter system according to the invention, and a regulation system associated with the same.

FIG. 1 depicts, in schematical block diagram form, the frequency-to-voltage converter according to the invention, and its application to a tachometric and speed-regulating system. An alternating voltage signal having a frequency representative of the quantity to be measured or regulated, usually the rotation speed of a shaft, is originated by a source device indicated by the reference numeral 1. This frequency will be hereinafter called detected frequency. This alternating voltage signal is supplied to a squaring amplifier 2 which changes it into a square pulse signal of suitable amplitude and the same frequency. This signal is in turn supplied to a control pulse generator 3, which produces control pulses of very short duration, in the order of a microsecond, having the same repetition rate as the detected frequency.

The control pulses are applied to a high-precision, fast recovery one-shot circuit 4.

As known, a one-shot circuit is a circuit which may be set in a first state ("work" state) by a suitable pulse signal applied to its input lead, and which remains in this "work" state for a predetermined delay time depending on its circuital characteristics. At the end of this delay time it resets itself in the opposite, or "rest," state. The output lead of the one-shot supplies a binary signal assuming either one of two binary levels (ONE or ZERO) corresponding to the "work" or "rest" state.

A one-shot is said to be a fast-recovery type, if a setting pulse may be applied to its input lead immediately after its reverting to the rest state, or possibly even during its work condition, without altering the delay time between the setting pulse and the instant of return to the rest state.

Assuming that the characteristic delay of the one-shot is shorter than the period of the sequence of control pulses, which is the same as the period of the detected frequency, the output of the one-shot 4 results in a sequence of pulses, having a repetition rate equal to the detected frequency, of the binary level corresponding to the rest state, and having a length equal to the difference between the period of the detected frequency and the characteristic delay of the one-shot.

Figures 2A, 2B, 2C, 2D, 2E:
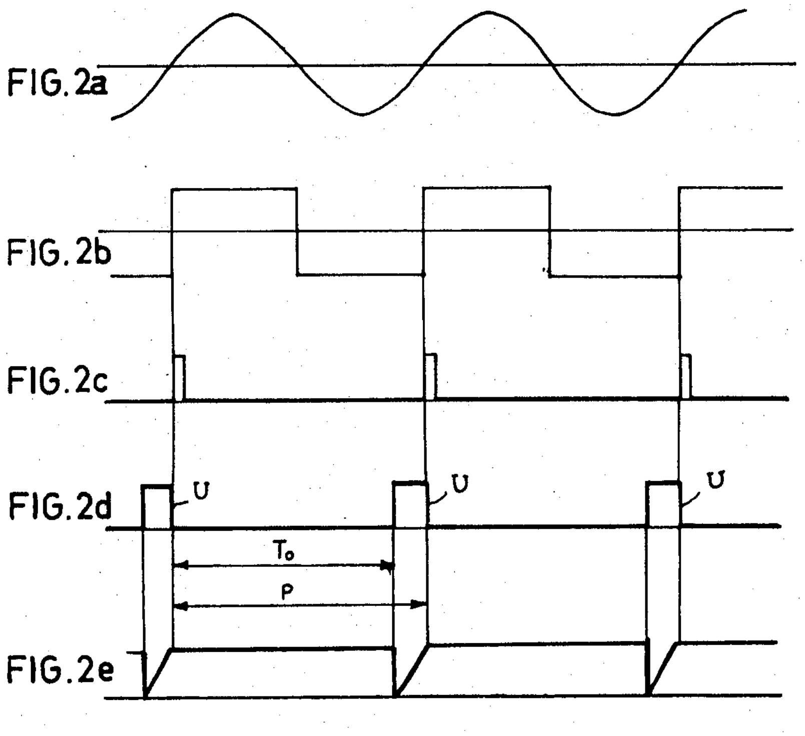
FIGS. 2*a*, 2*b*, 2*c*, 2*d*, and 2*e*, show the waveforms of different signals at various points of the block diagram of FIG. 1.

FIGS. 2*a*, 2*b*, 2*c*, and 2*d*, show the waveforms of the electrical signals present at the output of the circuit 1, 2, 3, and 4 respectively, that is:

FIG. 2*a* shows the sinusoidal waveform of the detected frequency supplied by the signal source 1;

FIG. 2*b* shows the square pulse signals supplied by the squaring amplifier 2;

FIG. 2*c* shows the sequence of control pulses produced by the pulse generator 3;

Finally, FIG. 2*d* shows the sequence of the variable length pulses U supplied by the one-shot 4.

Such pulses have a length $\Delta$ such that $\Delta = P - T_o$ where $P$ is the period of the detected frequency and $T_o$ the characteristic delay of the one-shot 4.

According to the invention, and with reference to FIG. 1 these pulses are used to control the operation of switches 5 and 6, which are open at rest. The first switch 5 is closed under direct control of the U pulses, for a time to their length. The second switch 6 is closed under the control of pulses supplied by an auxiliary pulse generator 7, or obtained by means of a differentiating circuit, providing very short pulses in correspondence to the rise fronts of pulse U. As may be seen from FIG. 1, the switch 6, when closed, short-circuits the capacitor 8 and causes its discharge.

On the other hand, the switch 5, when closed, connects the capacitor 8 to a constant current generator 9 and causes it to be charged to a final voltage value, depending on the charging time; that is, on the interval $\Delta$.

It follows therefrom, that the voltage V across the terminals of the capacitor 8, is proportional to $\Delta$ and, therefore, to the difference between the period of the detected frequency and the reference time $T_o$, which is the characteristic delay time of the one-shot; this voltage may be assumed as representative of the detected frequency. Thus, an effective frequency-to-voltage conversion is obtained.

The diagram of FIG. 2*e* depicts the waveform of the voltage across the capacitor terminals. Within the interval between two subsequent charging and discharging intervals corresponding to the U pulses, the voltage is constant.

If the period of the detected frequency closely approximates, by excess, the reference time $T_o$, the charging and discharging interval is very short with respect to the constant-voltage interval; therefore, with the exception of the short negative spikes, such voltage is a continuous function of the detected frequency and may be conveniently employed for linear regulation.

In FIG. 1 the connection of the terminals of capacitor 8 to a regulating amplifier 10, having a suitable input impedance, is shown by dashed lines. Its output provides a regulated feeding power to the motor M, whose speed is assumed to be measured by the detected frequency by means of the signal source 1.

Having described the essential aspects of the invention, it is now convenient to illustrate in detail a preferred embodiment of the conversion system, referring to a specific application, in the field of tape handling units for data processing systems.

Figure 3:
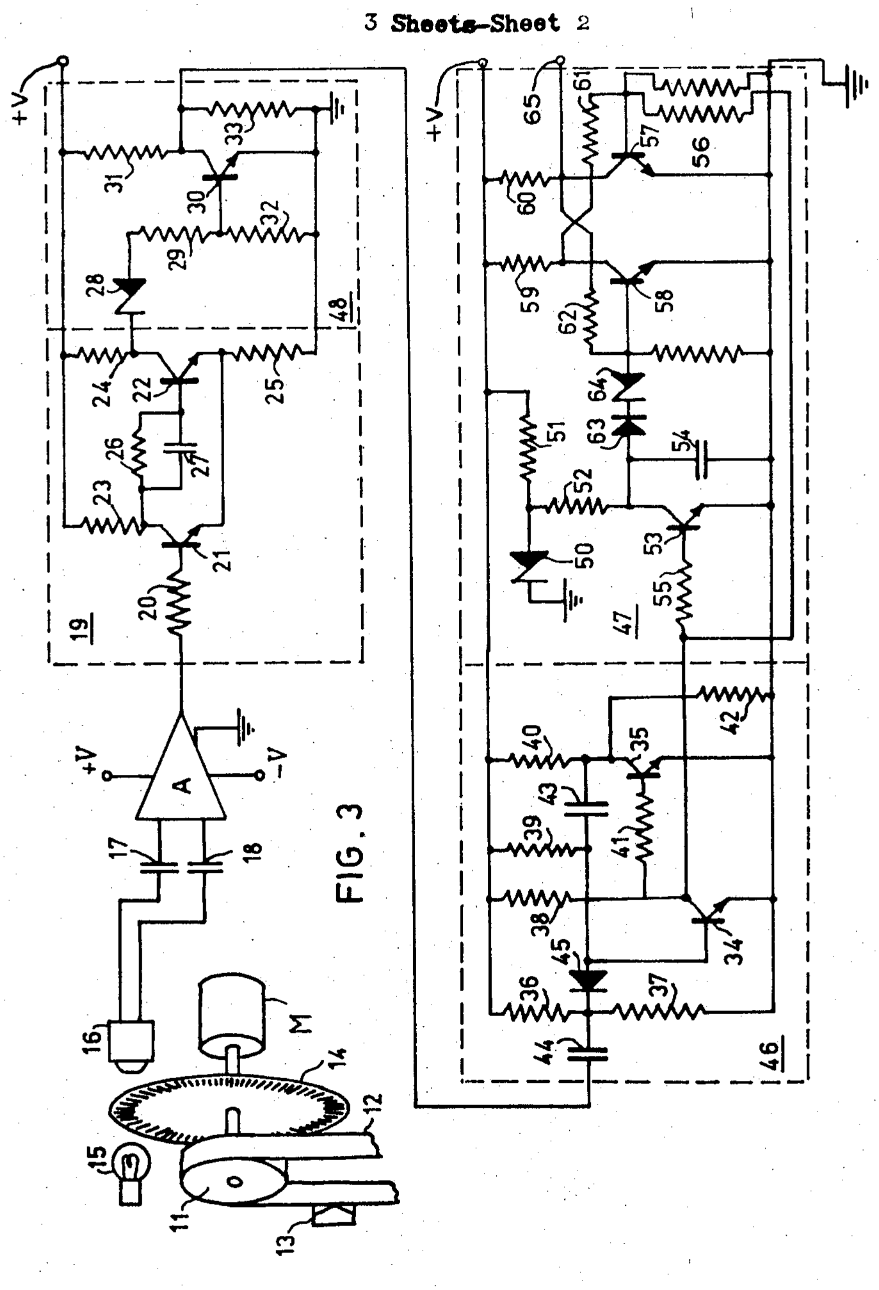
FIGS. 3 and 4 show the wiring diagrams of the circuits comprised in FIG. 1, according to a preferred embodiment of the invention.

FIG. 3 shows the essential components of a tape handling unit provided with a single capstan, that is, the tachometer, the frequency generator, the squaring and amplifying circuit, the control pulse generator and the one-shot circuit.

Figure 4:
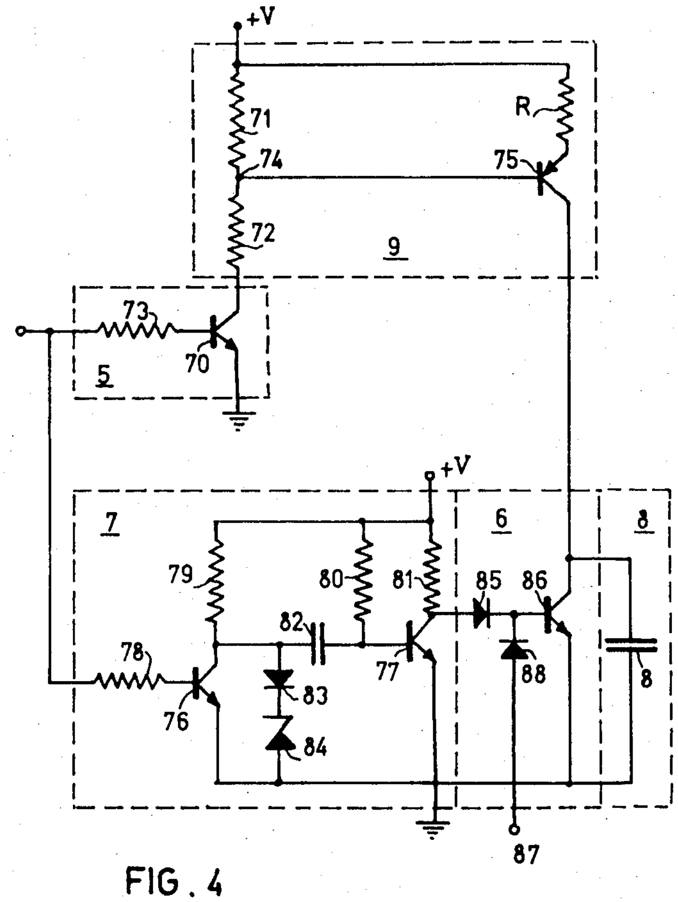

FIG. 4 shows the switches, the constant current generator, the auxiliary pulse generator and the capacitor.

With reference to FIG. 3, reference numeral 11 indicates a capstan around which the magnetic tape 12 is partially wound.

Pneumatic depression chambers, conveniently arranged and not shown in the drawing, ensure, in the known manner, a mechanical tension of the tape sufficient to drag the tape in the direction to conform to the capstan rotation, thus letting the tape run at a prefixed speed in front of the magnetic head 13.

The capstan 11 is secured to the shaft of the motor M which is controlled by a regulation circuit not illustrated here.

The detection of the rotating speed of the capstan is obtained by a means of a tachometric disc 14, which also is fixed to the motor shaft.

The tachometric disc carries at its periphery a very high number (some thousands) of transparent slits and is interposed between a light source 15 and a photosensitive element, for instance a photodetector 16.

The disc 14 during its rotation, periodically interrupts, the light rays which are sensed by the photodector 16, in such a way that the output of the same supplies a signal modulated by a frequency, representative of the rotation speed of the capstan 11.

As the slit density is very high, of the order of hundreds per centimeter, it is known to employ the disc in combination with a fixed mask having slits of the same dimension and of the same pitch, arranged to have a small obliquity with respect to the photodisk slits. Therefore "Moire fringes" are originated, which have larger dimensions and a large pitch, compatible with the physical dimensions of the photosensitive element 16. The modulated signals supplied by the photosensitive element 16 are applied, through two capacitively coupled inputs 17 and 18, to a differential amplifier A, suitably fed by two voltage sources +V and −V.

Differential amplifiers are well known to those skilled in the art, and are commercially available in the form of integrated circuits; it is therefore unnecessary to give a detailed description thereof.

The signal supplied by the differential amplifier A is a clipped sinusoid, whose waveform is proximate to a sequence of alternately positive and negative square pulses.

This waveform is further improved and reduced to a sequence of square waves by a discriminating, or "trigger," Schmitt circuit represented by the components contained in the dashed line rectangle, and indicated as a whole by the reference numeral 19.

Such a circuit, in one of its simplest form as the one shown here, is formed by an input resistor 20, two transistors 21 and 22, two collector resistors 23, 24 an emitter resistor 25 and a coupling circuit comprising a resistor 26 and capacitor 27 connected across the base of transistor 22 and the collector of transistor 24. The emitters of both transistors 21 and 22 are connected together and to the ground through the resistor 25. The collectors are fed by the voltage +V, through the corresponding resistors 23 and 24. The output signal of amplifier A is applied to the base of the transistor 21 by the resistor 20.

As long as the applied voltage is negative or low positive, the transistor 21 is off or only slightly conductive, therefore the collector potential is high and is applied through the resistor 26 and the base of transistor 22 which therefore is on.

When the voltage of the base of transistor 21 increases, and exceeds the emitter voltage of both transistors, the transistor 21 is conducting, and therefore the voltage of its collector decreases. This reduces the voltage of the base and of the emitter of transistor 22 and causes the emitter voltage of transistor 21 to decrease.

By such feed-back effect the base-emitter bias of transistor 21 is increased, the current through transistor 22 increases, the collector voltage of transistor 21 furtherly decreases, and transistor 22 is abruptly driven off. By a similar feed-back effect when the voltage applied to the base of the transistor 21 decreases beyond a predetermined value, transistor 22 abruptly goes on. The collector of transistor 22 is therefore subject to almost instantaneous voltage changes which originate a square-wave signal having extremely steep fronts.

The signal is applied, through a Zener diode 28 and resistor 29 to the inverter circuit 48 formed by a transistor 30 and resistor 31, as well as resistors 32 and 33. The object of this circuit is to adapt the levels of the signal supplied by the described Schmitt circuit, which are two positive voltage levels, to those required by the following pulse generator, which are a positive voltage level and a practically zero voltage level. Its operation should be clear to one skilled in the art, and therefore will not be described here in detail.

The output of the inverter circuit 48, consists of a sequence of square pulses which are applied to the control pulse generator 46. This generator comprises transistors 34, 35, resistors 36, through 42, a capacitor 43, an input capacitor 44 and a diode 45.

These components are connected together to the voltage source +V and to ground, as shown, thus forming the fully conventional one-shot circuit 46. In brief, in the rest condition the base of the transistor 34 is positively biased with respect to the emitter, by means of the resistor 39 and the transistor 34 is on.

The collector of transistor 34 is therefore at a voltage near 0 V., and so is the generator output lead, and the base of transistor 35, which are both connected to the collector of transistor 34. Therefore transistor 35 is off; its collector voltage is approximately +V and capacitor 43 is charged. Through the input capacitor 44 and diode 45, a short negative pulse is applied to the base of transistor 34 in correspondence to each falling front of the square-wave supplied by the inverter 48, having the detected frequency. Transistor 34 goes off and transistor 35 goes on: correspondingly, the collector voltage of the transistor 35 goes practically to 0 V. This rapid voltage decrease is transferred at the same time to the base of transistor 34 through the capacitor 43. Transistor 34 remains off even after the end of the short applied negative pulse, until the discharge of capacitor 48 through resistor 39 is almost completed. The output of the one-shot circuit therefore maintains a positive voltage for a time which depends on the time constant RC of the circuit comprising resistor 39 and capacitor 43.

Thus the circuit 46 supplies positive control pulses of the duration, for example, of a microsecond, at a repetition rate equal to the detected frequency. These control pulses are applied to an input of the fast recovery one-shot 47.

The wiring diagram of this circuit is shown in FIG. 3. By means of a Zener diode 50 and a resistor 51 a stabilized voltage +V′ is obtained from the voltage source +V. This voltage is applied, through resistor 52, to a transistor 53 and a capacitor 54. Resistor 52 and capacitor 54 form an RC circuit having a predetermined time constant. The transistor 53, when on, provides a discharging path of very low resistance, and therefore of very low time constant, for capacitor 54. The transistor 53 is driven by the control pulses supplied by the pulse generator 46 through a resistor 55.

The same control pulses are applied, through a resistor 56, to the base of a transistor 57 which therefore goes on. This transistor is coupled to a transistor 58 in such a way, as to form a bistable (flip-flop) circuit. The two transistors 58 and 59 are provided with two collector resistors 59 and 60 which are mutually cross-connected between the base of one transistor and the collector of the other one, by two base resistors 61 and 62.

As a pulse supplied by the one-shot 46 is applied to its base, the transistor 57 goes on, and consequently the transistor 58 goes off. This condition is also maintained after the control pulse is terminated, by the cross connection between bases and collectors, and the output terminal 65 is practically at 0 V. However, a connection between the collector of transistor 53 and the base of transistor 58 is provided by the diode 63 and the Zener diode 64.

At the end of the control pulse, the capacitor 54 starts to recharge and the voltage of the collector 53 increases according to the time constant RC of the circuit. When a prefixed reverse voltage value across the Zener diode is reached, that is, after a characteristic delay time $T_0$, it becomes conductive, and allows the transistor 58 to go on. As a consequence, transistor 57 goes off and the output lead of the circuit supplies a positive voltage valve, which is maintained until the reception of the following control pulse. It should therefore be apparent that the one-shot circuit supplies positive output pulses having a length equal to the difference between the characteristic delay time of the one-shot, $T_0$, and the period P of the control pulses.

FIG. 4 illustrates the manner in which these variable length pulses are transformed, by a very simple circuit, to a variable voltage output. The whole comprises the constant current generator 9, the switches 5 and 6, the auxiliary pulse generator 7 and the capacitor 8, already shown in block form in FIG. 1. They are implemented, as shown in FIG. 4, by the circuits comprised respectively in the dashed-line rectangles 9, 5, 6, 7, and 8.

The circuit of switch 5 comprises a transistor 70 whose emitter is grounded, and whose collector is fed by a voltage source +V through both series connected resistors 71 and 72.

The variable length pulses supplied by the one-shot circuit 47 (FIG. 3) are applied through the resistor 73 to the base of the transistor 70, and remains conductive for the whole length of each pulse.

Correspondingly, the point 74 assumes a potential E intermediate between +V and 0 voltage values, resulting from the values of the resistors 71 and 72. This voltage value controls the constant current generator 9 comprising transistor 75 and resistor R.

Transistor 75 is of the PNP type, that is, different from all other transistors previously indicated, which are of the NPN type. Its emitter is connected to a voltage source +V through a resistor R and the collector is connected directly to a terminal of capacitor 8, whose other terminal is grounded.

When the transistor 70 is off, the transistor 75 is also off. When transistor 70 goes on, the base of transistor 75 acquires the potential E of point 74, and delivers a constant current to the capacitor 8.

In fact, if V−E is the base voltage assigned to the voltage source +V, $I_E$ the emitter current, $V_{BE}$ the voltage drop between base and emitter, it follows that: $RI_E = (V-E) - V_{BE}$
that is, $$I_E = [(V-E) - V_{BE}]/R$$

$I_E$ is related to the collector current $I_C$ and to the base current $I_B$ by the relation:

$$I_E = I_C + I_B = I_C + (1/\beta)\, I_C$$

Where $\beta = I_C/I_B$ is the current gain of the transistor, and therefore a characteristic parameter of the same. Thus:

$$I_C = [((V-E) - V_{BE})/R]\ [\beta/(\beta + 1)]$$

The parameters $V$, $E$, $V_{BE}$, $\beta$ may be considered to be constant, and therefore the charge current $I_C$ for capacitor 8 is constant, at least until $E$ is higher than the charge voltage of the capacitor. If the capacitor 8 were completely discharged at the start of the process, it is now being charged up to a voltage $v = I_C\Delta/C$, where $I_c$ is the constant charge current, $\Delta$ the time of charge, and $C$ the capacity of the capacitor. V is therefore proportional to the charging time.

The same pulse which controls the charge of the capacitor 8, by its length, by its rising front, serves to put the capacitor in the initial condition of no charge. This pulse is applied to the input of circuit 7.

This circuit comprises transistors 76, 77, resistors 78, 79, 80, 81, capacitor 82, diode 83 and Zener diode 84, and provides to close the switch 6 for a short time interval under control of the rise front of the pulse supplied by the one-shot 47. This is achieved substantially by using a pulse generator circuit comprising the capacitor 82 and resistor 80, driven by the transistor 76.

In the rest conditions, that is, when no pulse is applied to the input, the transistor 76 is off and its collector, fed by the voltage source +V through a resistor 79, is at a positive potential, defined by the Zener voltage of the Zener diode 84.

Transistor 77, on the contrary, having its base connected to the voltage source +V through the resistor 80, is on, and its collector is at practically zero voltage. The capacitor 82 is charged. This voltage is applied through the diode 85 to the base of transistor 86, which corresponds to the switch 6 of FIG. 1, and is therefore off: that is, the switch is open.

When the pulse supplied by the one-shot is applied, through the resistor 78, to the base of transistor 76, this transistor goes on, and the collector voltage decreases abruptly.

This voltage decrease is transferred, through the capacitor 82, to the base of transistor 77 which goes off. The duration of this condition depends on the time constant RC of the differentiating circuit, as the capacitor 82 is discharged through the resistor 80 and the voltage of the base of transistor 77 gradually increases until the transistor 77 goes on. Therefore, for a short period, which can be set at any suitable value, transistor 77 is off and a positive voltage is applied to the base of transistor 86 through diode 85. During this period the transistor 86 conducts, and discharges the capacitor 8.

An auxiliary control input 87 may be provided, to apply a positive control voltage to the base of transistor 86 through the diode 88 in order to maintain the same in a steady on condition, thus preventing the capacitor 8 from being charged. This arrangement may be useful in a regulating system as the one outlined in FIG. 1, to exclude the regulating action and stop the motor.

It is intended that the described devices and circuits for the voltage-to-frequency converter, and for the speed regulating system to which it may be associated are merely a preferred embodiment of the invention, particularly simple and efficient, but more sophisticated embodiments to obtain high precision and high stability of the one-shots and of the whole system, may be adopted without departing from the spirit and scope of the invention.

What is claimed is:

1. A frequency-to-voltage converter device, comprising an input lead for an electric frequency signal having a frequency variable within predetermined limits;

circuital timing means comprising a monostable circuit adapted to assume either a first electrical state for a predetermined work time interval, or a second electrical state in rest conditions, said monostable circuit being repetitively set in said first work state by said electrical signal according to the said frequency;

a constant current generator;

an output capacitor;

a first switching means controlled by said monostable circuit, adapted to feed the constant current supplied by said generator to said capacitor during the rest condition of said monostable circuit;

an auxiliary pulse generator controlled by said monostable circuit for providing short pulses in coincidence with the reverting of said monostable circuit to the rest condition;

a second switching means responsive to said short pulses for short circuiting said capacitor in coincidence to said short pulses.

2. The converter device of claim 1, wherein said circuital timing means comprise an amplifier circuit, a squaring circuit for squaring said electrical frequency signal, and a control pulse generator adapted for supplying control pulses at a repetition rate equal to the frequency of said frequency signal, said control pulses being applied to the input lead of said monostable circuit.

3. The converter device of claim 2, wherein said constant current generator comprises a transistor having the emitter connected to a voltage source through a current limiting resistor, the collector connected to said capacitor, and the base connected to a suitable reference voltage.

4. The converter device of claim 3, wherein said reference voltage is obtained from said voltage source by means of a voltage divider connected at one end to said voltage source, and at the other end to said first switching means.

* * * * *